Oct. 25, 1932. H. STELZNER 1,884,342
PRODUCTION OF MASKS OF RUBBER OR OTHER SUITABLE ARTIFICIAL SUBSTANCES
Filed Jan. 15, 1931
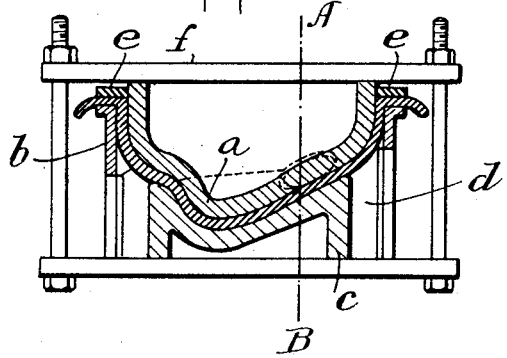
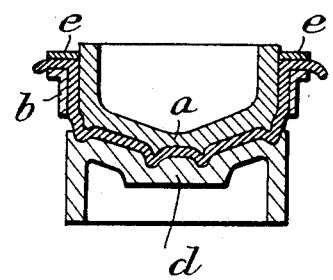
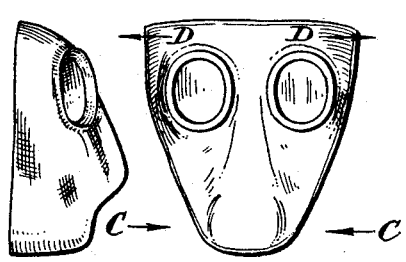
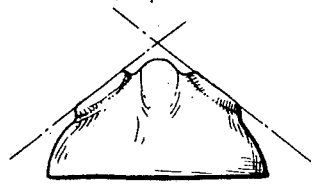
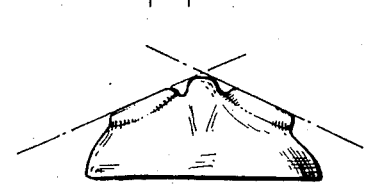
INVENTOR
HERMANN STELZNER
BY
ATTORNEYS Patented Oct. 25, 1932

1,884,342

UNITED STATES PATENT OFFICE

HERMANN STELZNER, OF LUBECK, GERMANY, ASSIGNOR TO OTTO HEINRICH DRAGER, OF LUBECK, GERMANY

PRODUCTION OF MASKS OF RUBBER OR OTHER SUITABLE ARTIFICIAL SUBSTANCES

Application filed January 15, 1931, Serial No. 508,889, and in Germany January 28, 1930.

The present invention relates to a method of producing masks of rubber or other suitable artificial substances and a mould for carrying the method into effect.

Hitherto masks of rubber, rubber coated substances or other suitable artificial substances were produced either in closed moulds in the unvulcanized condition or from completely vulcanized particles of rubber material which were sewn together and jointed in a fluid tight manner at the seams.

Both methods of production have disadvantages which require to be remedied by a suitable process. The method of production in closed moulds is too uneconomical as the closed moulds are too expensive. It is, however, not possible to carry out the method without a closed mould, as the unvulcanized rubber materials are too fluent during the subsequent vulcanizing of the rubber so that with an open mould and a textile layer on the outer side of the rubber sheet the rubber would pass out through the pores of the textile layer if very dense layers of textile material were not provided.

Completely vulcanized rubber materials, however, cannot be drawn or pressed in moulds as they would tear during this treatment, so that it is only possible to produce masks from completely vulcanized rubber material by sewing together separately cut portions and then jointing the seams in a fluid tight manner. These seams, however, even when the jointing is effected very carefully, are liable to become non-fluid tight and also have other disadvantages.

The present invention is adapted to eliminate these disadvantages in that a plate of rubber or of artificial material provided on one or both sides with textile material or rubber material or artificial material provided internally and externally with a number of layers of textile material is drawn or pressed in an open mould into the desired shape and then vulcanized. In order to enable the mask to be moulded in the open mould the chin portion is pressed laterally whilst the forehead portion is drawn outwardly laterally to an extent that the chin and edge portions of the eyes which normally are not at right angles to the plane of the face will come to lie at right angles to the plane of the face during the moulding.

If desired and particularly if there is no layer of textile material or only an outer layer of such material the plate to be treated is half vulcanized before the moulding.

In the accompanying drawing is illustrated by way of example a mould for carrying out the method and the relation of the mask shape to the shape of the mask when being worn is explained.

Figure 1 shows a longitudinal section of the open mould.

Figure 2 is a section on the line A—B of Figure 1.

Figures 3, 4 and 5 show the shape of the mask when worn in elevation, side view and plan, and Figures 6, 7 and 8 show the moulded mask in elevation, side view and plan.

The mould consists of the die $a$, the pressure ring $b$ and the matrices $c$ and $d$ for the formation of the hollow for the nose or the annular crater for the eye glasses and a fold holder $e$.

Into the mould is placed a sufficiently large piece of preferably semivulcanized rubber or rubber material or an artificial material and pressed under a drawing press $f$. In this manner the necessary pressure is exerted by the die $a$ on the rubber plate. By means of the drawing ring $b$ and the matrices $c$ and $d$ located underneath this ring there are formed the hollow for the nose and the annular craters for the eye glasses and the fold holder $e$ prevents the formation of folds at the edges.

The mask shape thus widened is brought into the vulcanizing boiler and vulcanized, or if the plate has already been pre-vulcanized the vulcanization is completed. After the vulcanization or the completion of the vulcanization the mask is removed from the mould and retains its shape with all the properties of a seamless rubber body.

The correct shape of the mask which it must have when applied to the face is illustrated in Figures 3 to 5. In this case the chin portion $g$ is somewhat drawn inwardly and the eye glass surfaces are located substantially at the correct angle relatively to one another. A mask of this shape, however, cannot be obtained with the mould illustrated in Figures 1 and 2. For these reasons the mask is produced in the open mould in a distorted manner as shown in Figures 6 to 8.

In this case all the raised edges are located in the direction of the drawing movement, that is to say the mask in the mould appears to be pressed or drawn in the direction of the arrows C, D in Figure 6. If the mask of the shape shown in Figures 6 to 8 is applied to the face it will assume the normal shape as illustrated in Figures 3 to 5.

Artificial substances similar to rubber which may be used instead of rubber are for example cellophane, gelatine, cellon, celluloid or the like. It is only necessary for the artificial material to have the property of being capable of being shaped in the moist or hot condition and after drying to become elastically rigid. For this property the term "vulcanization" is also directed to artificial substances.

The term "open mould" used in the present description is to be understood as a mould not covering all portions of the mask to be formed.

I claim:—

1. A method of producing masks in moulds out of rubber and similar artificial substances, comprising the steps of providing a partially vulcanized piece of rubber and textile material, subjecting parts of said piece to lateral drawing for the purpose of forming such portions of the mask which have an arched shape in operation, more particularly the chin and the forehead portions, said parts being suspended during the drawing process and coming in contact with a superposed pressure element only, and simultaneously compressing from above and below the remaining parts of said piece.

2. A method of producing masks in moulds out of rubber and similar artificial substances, comprising the steps of subjecting parts of a piece to be treated to lateral drawing, for the purpose of forming such portions of the mask which have an arched shape in operation, more particularly the chin and the forehead portions, said parts being suspended during the drawing process and coming in contact with a superposed pressure element only, and simultaneously compressing from above and below the remaining parts of said piece.

3. A mould for producing masks out of rubber and similar artificial substances, comprising in combination, a matrice for forming the hollows for the nose and eye glasses, a die situated over said matrice, a fold holder connected with said die, and a drawing ring situated at a predetermined distance from said fold holder.

In testimony whereof I have affixed my signature.

HERMANN STELZNER.